United States Patent Office 2,913,958
Patented Nov. 24, 1959

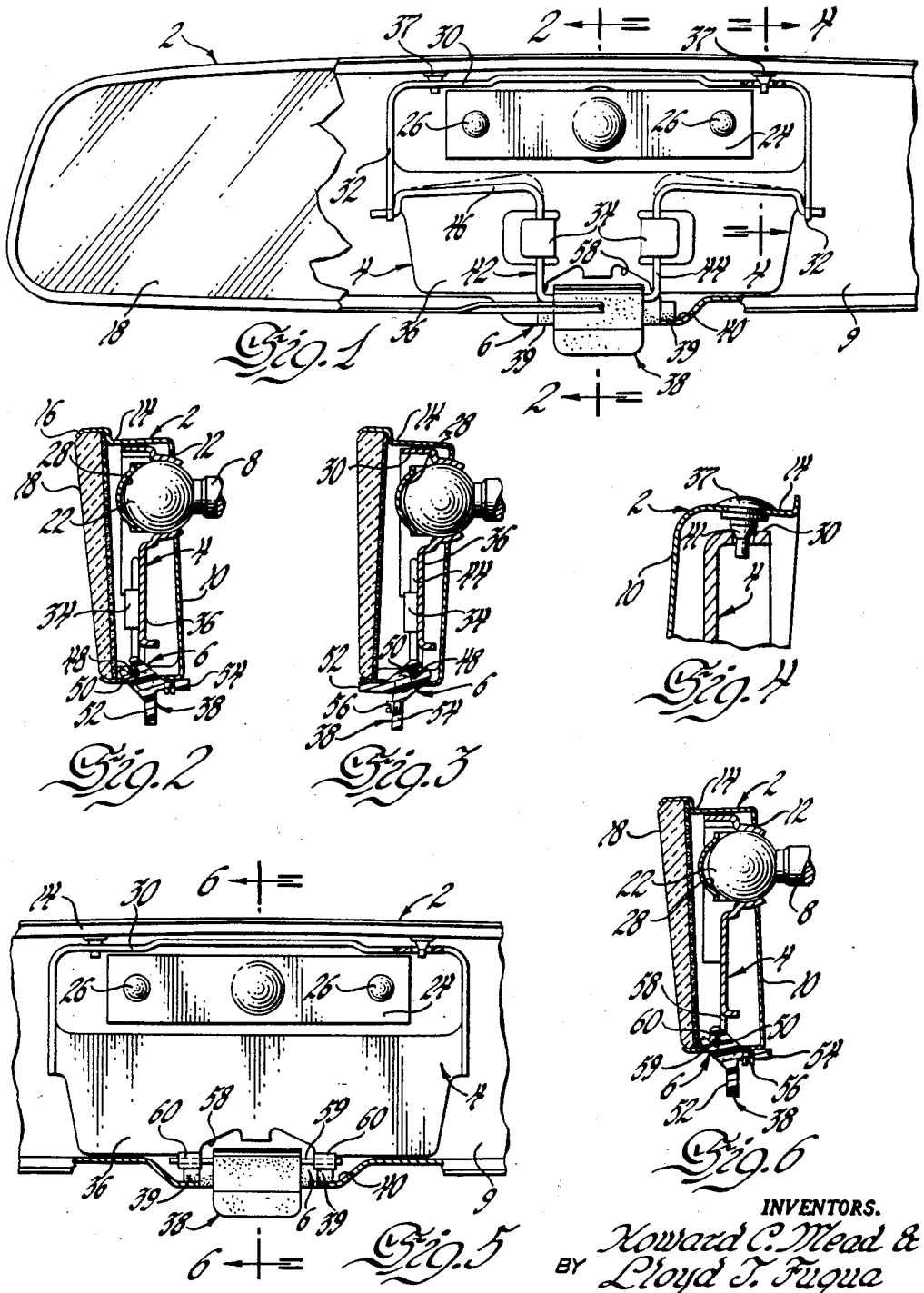

2,913,958

NON-GLARE MIRROR

Howard C. Mead, Anderson, and Lloyd T. Fuqua, Fortville, Ind., assignors to General Motors Corporation, Detroit, Mich., a corporation of Delaware Application October 15, 1956, Serial No. 616,028

11 Claims. (Cl. 88—77)

This invention relates to an anti-glare rear-view mirror and, in particular, to a means for mounting the mirror whereby the mirror housing is pivotally tiltable forwardly and rearwardly about a pivot plate between particularly defined and adjustable limits.

Rear-view mirrors have been commonly employed which comprise a housing mounted on a support operatively connected to the interior of a vehicle, and in which housing a prismatic mirror or two mirrors having two reflecting surfaces of different reflecting powers are pivotally mounted for forward and rearward tilting movement to a "day" or "night" position at the will of the vehicle operator by means of a tab secured to the lower wall of the mirror and extending through a centrally disposed slot in the lower wall of the housing. Various over-center spring arrangements have been suggested for controlling the tilting of the mirror within its housing with a snap or over-center action and to yieldingly maintain the mirror in either of its two tilted positions.

It is now proposed to construct a mirror assembly which includes a pivot plate secured to a ball stud on one end of a support member, and a mirror housing having an apertured rear wall through which the support extends and a continuous forwardly extending side wall in the forward face of which there is fixedly secured a prismatic mirror having two reflecting surfaces of different reflecting powers. It is further contemplated to provide a pivotal connection between the upper portion of the continuous side wall of the mirror housing and a forwardly extending upper flange on the pivot plate for forward and rearward tilting movement of the housing and its mirror relative to the pivot plate and support upon operation of a tilt mechanism.

The tilt mechanism employed to accomplish this end includes an operating lever pivotally seated in the central lower portion of the mirror housing, which lever has two angularly disposed legs at one end adapted to abut the mirror housing to limit pivotal movement of the lever. At the other end of this lever within the mirror housing and in close proximity to the pivot plate, there is a spring seat carried through an arcuate path upon pivotal movement of the lever between the stops defining the forward and rearward tilted positions of the mirror housing as selected by the vehicle operator. An operating spring is mounted in the spring seat for relative rotary sliding movement therein upon manipulation of the lever and is secured to the pivot plate. Thus, as the spring seat of the lever swings through its arcuate path and over center from either stop position, the spring may flex to accommodate such movement and operate to yieldingly maintain the mirror housing in its selected position. In other words, a pivotally mounted operating lever with an over-center action is utilized with a wire spring secured to the pivot plate, which spring by merely flexing will provide a smooth tilting action as the lever is operated.

Within the scope of this invention, the spring employed may be of any suitable shape depending upon size limitations and the ease of operation desired. For the purpose of this disclosure, two forms of such a spring have been shown although it will be understood that other shapes and forms will be obvious to one desiring particular characteristics of operation within available size limitations. Suffice it to say that in each instance the spring is not of the over-center type inasmuch as the over-center action is provided by the pivotable operating lever. The spring, therefore, may be completely secured to the pivot plate and engaged by the operating lever, or at least secured to the pivot plate to preclude the relative rotary movement therebetween as found in a conventional over-center spring so long as the spring may flex to accommodate the over-center action and movement of the operating lever between particularly defined stops.

It is, therefore, an object of this invention to provide a simple mounting structure for an anti-glare rear-view mirror having a mirror housing pivotally mounted with respect to an interiorly positioned pivot or mounting plate and support therefor for relative tilting movement of the housing relative to the pivot plate and support, which mounting structure includes a simple and inexpensive operating mechanism for accomplishing the tilting action between particularly defined and preferably adjustable stops.

It is a further object of this invention to provide a mounting structure for an anti-glare rear-view mirror of the type described which includes an operating lever pivotally mounted on a mirror housing and having angularly disposed legs or stops for abutment with the mirror housing to limit tilting movement in two directions, and having a spring seat movable through an arcuate path and in which there is positioned a spring for relative rotary slidable movement therein, which spring is secured to the pivot plate for flexing movement as the spring seat moves through its arcuate path.

It is another object of this invention to provide a mounting structure for an anti-glare rear-view mirror which includes an operating mechanism utilizing an angularly selectively manually adjustable operating lever having members acting as stops in cooperation with a mirror housing and pivotally engaging a spring secured against rotation to a pivot plate about which the mirror housing is tiltably supported.

It is a further object of this invention to provide a simple and inexpensive operating mechanism for a tiltable anti-glare rear-view mirror of the type described in which means carried by a stop member or members of the operating lever permit manual adjustment of the extent of tilting of the mirror housing relative to the support structure on which it is mounted.

These and other objects of this invention will appear more fully hereinafter as the description of the invention proceeds, reference being made to the drawings in which like numerals refer to like parts in the several views, and in which:

Figure 1 is a front elevational view of one preferred embodiment of the mirror assembly partially broken away to disclose the mounting and tilt actuation structures;

Figure 2 is a cross-sectional view taken on line 2—2 of Figure 1 showing the arrangement of the assembly when tilted to its "day" position;

Figure 3 is a cross-sectional view taken on line 2—2 of Figure 1 showing the arrangement of the assembly when tilted to its "night" position;

Figure 4 is a cross-sectional enlarged view taken on line 4—4 of Figure 1;

Figure 5 is a front elevational view of another embodiment of the mirror assembly broken away to show another tilt actuation structure;

Figure 6 is a cross-sectional view taken on line 6—6 of Figure 5.

Referring now to Figures 1 to 4 and a preferred embodiment of this invention, there is shown an anti-glare rear-view mirror assembly comprising a mirror housing 2, pivot or mounting plate 4, a spring and lever tilting mechanism generally designated at 6, and a support 8 adapted to be suitably secured within the interior of a vehicle and on which the mirror assembly is mounted for adjustment into the line of vision desired by the vehicle operator.

The mirror housing 2 comprising a substantially cup-shaped shell 9 having a rear wall 10 defining an aperture 12 therein through which the support 8 extends into the shell interior, and a continuous forwardly extending side wall 14 in which, at its forward end, there is fixedly secured by the inturned crimped flange 16 a conventional prismatic mirror 18 having two reflecting surfaces of different reflecting powers.

The pivot or mounting plate 4 is disposed within the mirror housing interior behind the mirror and is universally mounted on the ball stud 22 on the support 8. A transversely extending metal strip 24 is riveted or otherwise suitably secured at 26 to the pivot plate and has a substantially centrally located seat portion 28 engaging the forward end of the ball stud to complete the mounting of the pivot plate thereon. It will be noted that aperture in the rear wall of the mirror housing is spaced from the ball stud and the mounting thereon of the pivot plate so as not to interfere with the relative tilting movement of the mirror housing with respect to the pivot plate and support.

The pivot plate has a continuous forwardly extending wall 30 across its top portion and down both sides to a point below the intermediate portion of its vertical height where the wall terminates in two laterally spaced downwardly opening locking lugs 32. Two laterally spaced oppositely disposed locking tabs 34 are formed integral with a lower skirt portion 36 of the pivot plate between and below the locking lugs 32 for a purpose to be described more fully hereinafter. Two laterally spaced rivets 37 having conical surfaces 41 extend through suitable apertures in the vertically spaced upper portions of the housing side wall 14 and the forwardly extending wall 30 of the pivot plate to form a pivot connection for the mirror housing about the pivot plate.

The operating mechanism for tilting the mirror housing comprises a lever 38 having laterally extending co-axial substantially cylindrical arms 39 pivotally seated in an accommodating depression 40 in the lower central portion of the side wall 14 of the mirror housing, and a spring 42 having an intermediate substantially U-shaped section, the upstanding side legs 44 of which are held flush to the pivot plate by the locking tabs 34, and which legs terminate in laterally projecting wire sections 46 seated in the locking lugs 32. The lower portion 48 of the U-shaped intermediate spring section is seated in a longitudinally extending groove or spring seat 50 in one end of the operating lever within the mirror housing. At its other end, the operating lever is provided with two angularly disposed legs 52 and 54 which may be grasped by the vehicle operator to pivot or rotate the lever, each leg upon selective abutment with the mirror housing forming a stop to limit tilting movement of the lever and consequently of the housing with respect to the pivot plate and support. The leg 54 is further provided with a manually adjustable screw 56 threadably mounted therein to vary the stop position of the mirror housing with respect to the pivot plate and support.

To tilt the mirror housing from its Figure 2 to its Figure 3 position, the vertically depending lever leg 52 is grasped and actuated by the operator causing the spring seat of the lever to traverse an arcuate path, thereby resulting in the entire spring 42 flexing upwardly against the locking lugs 32 while being retained flush against the pivot plate by the locking tabs 34. As the lever is operated, there is relative rotary sliding movement between the spring seat 50 and the lower portion 48 of the spring. This flexing movement of the spring 42 as the operating lever 38 moves over center is indicated by the dotted lines in Figure 1. Upon the spring seat moving over center, the spring is operative to complete the tilting of the mirror housing with a snap action and to retain it in the selected position defined by the stop formed by the lever leg 52 abutting the mirror housing.

Thus, it will be seen that the rotatable lever mounted on the mirror housing cooperates with the flexing spring held flush to the pivot plate to provide a smoothly operating tilting mechanism to selectively adjust the mirror to a "day" or "night" position easily adjustably defined by stops carried by the operating lever.

In Figures 5 and 6 another embodiment of the anti-glare mirror assembly is disclosed which utilizes a very simple spring arrangement fixedly secured to the pivot plate and seated on the inner end of the operating lever to flex in response to over-center movement of the latter.

Referring now to the drawing, it may be seen that the lower central portion of the pivot plate skirt 36 has a vertically extending recess 58 formed therein and across which there extends a horizontal piece of wire spring 59, the ends of which are suitably fixedly secured in brackets 60 depending from the lower edge of the pivot plate skirt on either side of the recess. The portion of the wire spring intermediate its ends is seated as before in the spring seat 50 of the operating lever 38. As the lever is rotatably manipulated, the spring seat 50 will be carried through the recess 58 in an arcuate path thereby flexing the spring upwardly as the lever approaches an over-center position relative to the pivot plate. As the lever goes over center, the wire spring will complete the tilting with a snap action and yieldingly maintain the mirror housing in a selected tilted position as defined by the abutment of one lever leg with the mirror housing. Although the wire spring has been disclosed as mounted on laterally spaced brackets depending from the lower edge of the pivot plate skirt, it will be readily apparent that this spring could be connected anywhere on the depending skirt portion 36 of the pivot plate by merely forming a deeper vertical recess in the lower edge of the pivot plate and providing an operating lever of greater height having a spring seat therein for cooperation with the spring, the height of the inner end of the spring seat being sufficiently less than the depth of the recess so as to enable the former to clear the latter as it swings through its arcuate path.

It will be noted that the springs employed in the two embodiments disclosed differ in that the first disclosed spring 42 is not completely fixedly secured to the pivot plate, but rather may flex upwardly about the locking lugs 32 although it is held flush to the pivot plate by the locking tabs 34. In the second embodiment, the spring 59 is securely anchored to the pivot plate. In both embodiments, there is no relative rotary movement between the spring and the pivot plate inasmuch as the pivotally mounted operating lever provides the desired over-center action as well as having means mounted thereon to adjustably define the limits of tilting movement of the mirror housing relative to the pivot plate. It is intended to employ the spring of the first embodiment where a smoothly operating tilt mechanism is desired, but space limitations prevent the use of a long horizontal length of wire. Conversely, if the lateral width of the mirror is such as to enable the use of a relatively long horizontal run of wire, the simpler spring configuration of the second embodiment may be economically employed. It will be readily apparent, however, that notwithstanding space requirements, both spring configurations will provide the tilting operation herein described, the smoothness of operation of the spring being related to the length of wire available for flexing movement.

Although only two embodiments of this invention have been shown and described, it will be readily apparent

We claim:

1. An anti-glare rear-view mirror comprising a housing in which there is positioned a mirror having two reflecting surfaces of different reflecting powers, which housing has an apertured wall through which a support extends into the housing interior; a pivot plate mounted on said support within said housing, a pivotal connection between said housing and pivot plate for forward and rearward tilting movement of said housing relative to said pivot plate and support; an operating lever pivotally mounted on said housing and including an inner end within said housing and an outer operating end accessible exteriorly of said housing, a spring seat on said inner lever end; a spring operative after the housing is partially tilted into either position through pivotal movement of said lever to complete tilting with a snap action, and operative yieldingly to hold the housing in either its forward or rearward position, said spring being secured to said pivot plate for flexing movement relative thereto and mounted in said spring seat whereby said housing is pivotal between said positions upon pivoting said lever.

2. An anti-glare rear-view mirror comprising a housing in which there is positioned a mirror having two reflecting surfaces of different reflecting powers, which housing has an apertured rear wall through which a support extends into the housing interior; a pivot plate mounted on said support within said housing, a pivotal connection between said housing and pivot plate for forward and rearward tilting movement of said housing and mirror relative to said pivot plate and support; an operating lever pivotally mounted on said housing and including an inner end within said housing and an outer operating end accessible exteriorly of said housing and having angularly disposed legs to selectively abut said housing to limit pivotal movement of said lever with respect to said housing, a spring seat on said inner lever end; a flexible spring operative after the housing is partially tilted into either position through pivotal movement of said lever to complete tilting with a snap action, and operative yieldingly to hold the housing in either of its fully tilted positions as limited by abutment of said lever legs with said housing, said spring being secured for flexing movement to said pivot plate and mounted in said spring seat whereby said housing is pivotal between said positions upon pivoting said lever.

3. An anti-glare rear-view mirror comprising a housing in which there is positioned a mirror having two reflecting surfaces of different reflecting powers, which housing has an apertured rear wall through which a support extends into the housing interior; a pivot plate mounted on said support within said housing and having a depending skirt, a pivotal connection between said housing and pivot plate for forward and rearward tilting movement of said housing and mirror relative to said pivot plate and support, two laterally spaced opposed locking tabs on said skirt beneath said pivot connection; an operating lever pivotally mounted on said housing and having angular disposed legs to selectively abut said housing to limit pivotal movement of said lever with respect to said housing; a spring operative after the housing is partially tilted into either position through pivotal movement of said lever to complete titling with a snap action, and also operative yieldingly to hold the housing in either of its fully tilted positions as limited by abutment of said lever legs with said housing, said spring being pivotally connected to the operating lever within the interior of said housing, and secured flush to said pivot plate by said locking tabs.

4. An anti-glare rear-view mirror comprising a housing in which there is positioned a mirror having two reflecting surfaces of different reflecting powers, which housing has an apertured rear wall through which a support extends into the housing interior; a pivot plate mounted on said support within said housing and having a depending skirt, a pivotal connetcion between said housing and pivot plate for forward and rearward tilting movement of said housing and mirror relative to said pivot plate and support, two laterally spaced opposed locking tabs on said skirt, two downwardly opening locking lugs on said skirt laterally spaced to either side of said tabs; an operating lever pivotally mounted on said housing and having angularly disposed legs to selectively abut said housing to limit pivotal movement of said lever with respect to said housing; a spring operative after the housing is partially tilted into either position through pivotal movement of said lever to complete tilting with a snap action, and also operative yieldingly to hold the housing in either of its fully tilted positions as limited by abutmetn of said lever legs with said housing, said spring comprising an intermediate substantially U-shaped section terminating in two spaced laterally extending sections, the bottom of said U-shaped section being seated on said lever within the interior of said housing, the two upstanding leg portions of said U-shaped section and the laterally extending sections being secured flush to said pivot plate by said locking tabs and locking lugs for flexing movement relative thereto.

5. An anti-glare rear-view mirror comprising a housing in which there is positioned a mirror having two reflecting surfaces of different reflecting powers, which housing has an apertured rear wall through which a support extends into the housing interior; a pivot plate mounted on said support within said housing and having a depending skirt, a pivotal connection between said housing and pivot plate for forward and rearward tilting movement of said housing and mirror relative to said pivot plate and support, two laterally spaced opposed locking tabs on said skirt, two downwardly opening locking lugs on said skirt laterally spaced to either side of said tabs; an operating lever pivotally mounted on said housing and having angularly disposed legs to selectively abut said housing to limit pivotal movement on said lever with respect to said housing, a laterally extending groove in said lever in the interior of said housing; a spring operative after the housing is partially tilted into either position through pivotal movement of said lever to complete tilting with a snap action, and operative yieldingly to hold the housing in either of its fully tilted positions as limited by abutment of said lever legs with said housing, said spring comprising a substantially U-shaped central portion each upstanding leg of which terminates in a laterally projecting length of wire, the lower side of said central U-shaped portion being seated in the groove in said lever, the upstanding leg portions being held flush with said pivot plate by said locking tabs and said laterally extending lengths being seated in said locking lugs.

6. An anti-glare rear-view mirror comprising a cup-shaped mirror housing having a rear wall and a continuous forwardly extending side wall and provided with an aperture in its rear wall, a mirror fixedly secured in the front of said housing side wall and having two reflecting surfaces of different reflecting powers, a support extending through the aperture into the interior of said housing; a pivot plate mounted on said support and having a depending skirt, two laterally spaced opposed locking tabs on said skirt, a continuous forwardly extending wall across the upper portion of said pivot plate and extending down the sides thereof and terminating in downwardly opening locking lugs laterally spaced to either side of said locking tabs, conical rivets forming a pivotal connection between said mirror housing side wall and the pivot plate upper wall for forward and rearward tilting movement of said housing relative to said pivot plate and support; an operating lever pivotally mounted on the lower portion of said mirror housing side wall, said lever having two angularly disposed legs adapted to abut the exterior of said mirror housing to limit pivotal movement in two directions of said lever, a spring seat on said lever within the interior of said housing; an integral spring operative after the housing is partially tilted into either position through pivotal movement of said lever to complete tilting with a snap action, and operative yieldingly to hold the housing in either of its fully tilted positions as limited by abutment of said lever legs with said housing, said spring comprising a laterally extending length of wire mounted in said lever, two laterally spaced upstanding legs secured flush to said pivot plate by said locking tabs, said legs terminating in laterally extending lengths anchored in said locking lugs.

7. The mirror structure defined in claim 2 which further includes an adjustable stop carried by at least one of said angularly disposed legs to vary the tilt position of said mirror housing relative to said pivot plate and support.

8. An anti-glare rear-view mirror comprising a housing in which there is positioned a mirror having two reflecting surfaces of different reflecting powers, which housing has an apertured rear wall through which a support extends into the housing interior; a pivot plate mounted on said support within said housing, a pivotal connection between said housing and pivot plate for forward and rearward tilting movement of said housing and mirror relative to said pivot plate and support; an operating lever pivotally mounted on said housing and including an inner end within said housing and an outer operating end accessible exteriorly of said housing and having angularly disposed legs to selectively abut said housing to limit pivotal movement of said lever with respect to said housing, a spring seat on said inner lever end; a spring operative after the housing is partially tilted into either position through pivotal movement of said lever to complete tilting with a snap action, and operative yieldingly to hold the housing in either of its fully tilted positions as limited by abutment of said lever legs with said housing, said spring being fixedly secured to said pivot plate and mounted in said spring seat whereby said housing is pivotal between said positions upon pivoting said lever.

9. An anti-glare rear-view mirror comprising a housing in which there is positioned a mirror having two reflecting surfaces of different reflecting powers, which housing has an apertured wall through which a support extends into the housing interior; a pivot plate mounted on said support within said housing, a recess in said pivot plate proximate to the bottom of said housing, a pivotal connection between said housing and pivot plate above said recess for forward and rearward tilting movement of said housing relative to said pivot plate and support; an operating lever pivotally mounted on said housing, said lever having angularly disposed legs at one end to selectively abut the exterior of said housing to limit pivotal movement of said lever with respect to said housing, the other end of said lever being disposed within said housing for arcuate movement through the recess in said pivot plate; a spring operative after the housing is partially tilted into either position through pivotal movement of said lever to complete tilting with a snap action, and also operative yieldingly to hold the housing in either of its fully tilted positions as limited by abutment of said lever legs with said housing, said spring comprising a resilient wire fixedly secured on said pivot plate across said recess, said wire being pivotally mounted on said other end of said pivotable lever.

10. An anti-glare rear-view mirror comprising a housing in which there is positioned a mirror having two reflecting surfaces of different reflecting powers, which housing has an apertured wall through which a support extends into the housing interior; a pivot plate mounted on said support within said housing, a pivotal connection between said housing and pivot plate for forward and rearward tilting movement of said housing and mirror relative to said pivot plate and support; an operating lever pivotally mounted on said housing, angularly disposed legs on one end of said lever to selectively abut said housing exterior to limit pivotal movement of said lever with respect to said housing, a spring seat on the other end of said lever within said housing; and a spring operative after the housing is partially tilted itno either position through pivotal movement of said lever to complete tilting with a snap action, and also operative yieldingly to hold the housing in either of its fully tilted positions as limited by abutment of said lever legs with said housing, said spring comprising an integral resilient wire fixedly secured to said pivot plate and seated in said spring seat on said pivotable operating lever for relative rotary sliding movement therebetween.

11. An anti-glare rear-view mirror comprising a housing in which there is positioned a mirror having two reflecting surfaces of different reflecting powers, which housing has an apertured wall through which a support extends into the housing interior; a pivot plate mounted on said support within said housing, a pivotal connection between said housing and pivot plate for forward and rearward tilting movement of said housing relative to said pivot plate and support; an operating lever pivotally mounted on said housing, said lever having angularly disposed legs at one end to selectively abut the exterior of said housing to limit pivotal movement of said lever with respect to said housing, the other end of said lever being disposed within said housing for arcuate movement relative to said pivot plate; a spring operative after the housing is partially tilted into either position through pivotal movement of said lever to complete tilting with a snap action, and also operative yieldingly to hold the housing in either of its fully tilted positions as limited by abutment of said lever legs with said housing, said spring comprising a resilient wire mounted on said pivot plate for flexing movement relative thereto, said wire being pivotally mounted on said other end of said pivotal lever.

References Cited in the file of this patent

UNITED STATES PATENTS

| | | |
|---|---|---|
| 2,469,207 | Roedding | May 3, 1949 |
| 2,640,394 | Bertell | June 2, 1953 |
| 2,691,919 | Springer | Oct. 19, 1954 |
| 2,722,159 | Budreck | Nov. 1, 1955 |
| 2,839,979 | Meade | June 17, 1958 |

FOREIGN PATENTS

| | | |
|---|---|---|
| 1,000,125 | France | Nov. 28, 1955 |